United States Patent [19]
Gargan, Jr. et al.

[11] Patent Number: 5,788,839
[45] Date of Patent: Aug. 4, 1998

[54] TRAVELING SELF-CLEANING FISH SCREEN

[75] Inventors: Eugene L. Gargan, Jr.; Richard E. Gargan, both of Shafter, Calif.

[73] Assignee: Farm Pump and Irrigation Co., Shafter, Calif.

[21] Appl. No.: 633,224

[22] Filed: Apr. 16, 1996

[51] Int. Cl.[6] ................................................. B01D 33/048
[52] U.S. Cl. ............................ 210/160; 210/400; 210/499
[58] Field of Search ................................. 210/158, 160, 210/161, 400, 499

[56] References Cited

U.S. PATENT DOCUMENTS

| | | | |
|---|---|---|---|
| 1,194,250 | 8/1916 | Smits | 210/160 |
| 1,208,655 | 12/1916 | Reynolds | 210/160 |
| 1,592,708 | 7/1926 | Roddy | 210/160 |
| 1,864,359 | 6/1932 | Laughlin et al. | 210/160 |
| 3,716,144 | 2/1973 | Bartlow | 210/499 |
| 3,802,565 | 4/1974 | Hughes | 210/160 |
| 4,040,952 | 8/1977 | Jopp | 210/400 |
| 4,323,451 | 4/1982 | Hagiharm | 210/160 |
| 4,360,426 | 11/1982 | Wetzel | 210/160 |
| 4,447,324 | 5/1984 | Jackson | 210/161 |
| 4,541,930 | 9/1985 | Heidler | 210/161 |
| 4,582,601 | 4/1986 | Strow | 210/161 |
| 4,812,231 | 3/1989 | Wiesemann | 210/400 |
| 4,892,652 | 1/1990 | Rudy | 210/400 |
| 5,387,336 | 2/1995 | Boynet et al. | 210/400 |
| 5,476,588 | 12/1995 | Nagnoka | 210/499 |

FOREIGN PATENT DOCUMENTS 173995 1/1922 United Kingdom .
319068 9/1929 United Kingdom .

OTHER PUBLICATIONS

Pankratz, Tom M., "Screening Equipment Handbook", 2d ed., pp. 21, 38–41, 83.

Standard Balanced (BS) brochure for wire screens.

*Primary Examiner*—Christopher Upton
*Attorney, Agent, or Firm*—Mark D. Miller

[57] ABSTRACT

A traveling water and fish screen device is provided for separating debris from channels of flowing of water. The device includes a carriage that is placed in the water flow and a screen mounted in the carriage which utilizes a continuous band of specially constructed rigid grate panels pivotally attached to and separated by support members in the form of cross bars between each panel. Special hinges are used which provide an extremely small gap between each panel and the adjacent cross bars, which gap is maintained as the as the band rotates around upper and lower cylinders in the carriage. Flaps are provided on the outward, upstream edges of the carriage to prevent debris from coming into contact with the cylinders, support chains or sprockets of the device. The rigid grate panels each have a first set of parallel cross members, and a second set of parallel cross members that are perpendicular to the first set. The ends of the cross members on the outward, upstream surface of each panel are flat and smooth to help prevent entanglement of debris and injury to fish. These same cross members are also tapered such that they are wider on the outward, upstream surface tapering to a more narrow cross-section toward the inside surface which facilitates easier cleaning with a pressurized spray.

17 Claims, 4 Drawing Sheets

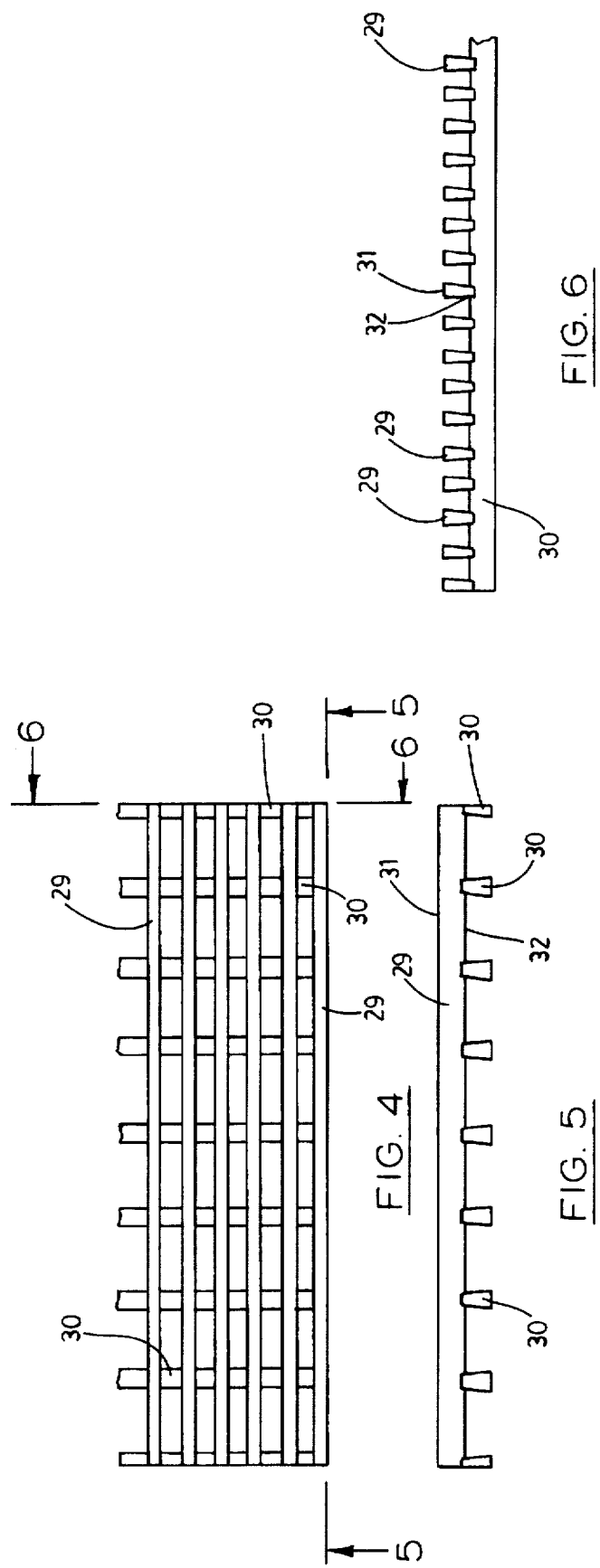

TRAVELING SELF-CLEANING FISH SCREEN

BACKGROUND OF THE INVENTION

1. Field of the Invention

The present invention relates to traveling water screens, and more particularly to a new and improved apparatus for screening debris and fish from irrigation water.

2. Description of the Prior Art

Traveling water screens are used as cleaning devices in irrigation canals and other channels of flowing water in order to separate debris and other materials from the water. These devices are normally placed in front of openings in surface water channels. They protect pumping or other downstream equipment from objectionable debris in surface water intakes or other applications. As raw water passes over the screen, debris is collected and retained on the upstream face of the screen. The debris-laden screen is then rotated and lifted out of the flow to an area where a high pressure water spray is directed outward through the mesh to remove impinged debris which is collected for disposal.

There are two basic varieties of traveling water screens: belt screens, and basket (or tray) screens. Belt screens consist of an endless wire mesh belt having chains or other mounting means along both sides of the belt. Two rotating cylinders are provided on the inside of the belt, one at either end. The chains are mounted around head- and foot-sprockets located on the cylinders. As the cylinders rotate, they pull the chains thereby rotating the belt screen. As raw water is drawn through the screen, debris builds up on the upstream surface. One of a variety of different mesh sizes may be employed in belt screens, depending upon the needs of the user. Such screens are illustrated in Pankratz, *Screening Equipment Handbook*, pp. 38–39, and the referenced F.P.I. brochure.

Basket screens (also sometimes called band screens) consist of a plurality of individual wire mesh panels bolted to basket frames, or trays, and attached to two matched strands of roller chain. The chain operates in a vertical path over head- and footsprockets, carrying the baskets down into the water, around the footsprockets, and back up through the water, over the headsprockets. As raw water passes through the revolving baskets, debris is collected and retained on the upstream face of the wire mesh panels. Larger particles are collected on a wide lifting shelf that forms the lower, or trailing, edge of the basket frame. As with belt screens, once the debris-laden trays are lifted out of the flow, high pressure water is directed outward through the mesh to remove the debris. Examples of basket water screens are found in U.S. Pat. Nos. 3,3802,565, 4,040,952, 4,447,324 and 4,582,601.

Traveling water screens using baskets or trays suffer from the drawback that they must compensate for the gaps between individual baskets in order to prevent debris from passing between the baskets. Elaborate joint structures have been developed to maintain a constant seal between baskets, as illustrated in U.S. Pat. Nos. 4,360,426 and 4,541,930.

Both belt and basket water screens suffer from the additional drawback that it is often difficult to completely clean accumulated debris from the wire mesh. This because the mesh consists of a double layer, and debris can become imbedded between the layers. The high pressure water spray will normally eliminate loose debris from the surface of the screen, but may not completely remove debris that has become entangled with the mesh of the screen. Buildup of debris over time can affect the efficiency of the water screen.

Many traveling water screens are used in permanent or semi-permanent flows where fish populations develop. In states such as California, the Department of Fish and Game has established specific guidelines for water screens to protect fish populations. These guidelines specify such things as minimum surface areas for the removal of a given volume of water, minimum opening sizes, etc. For example, current California law requires an area of at least 1.5 square feet for each cubic foot of water screened (1 square foot for each 300 gallons per minute) and slot openings no larger than three-thirty-seconds of an inch ($3/32"$). These specifications limit the velocity of water drawn through the screen so that small fish (minnows) are able to escape from in front of it. No known belt or basket screen is capable of meeting these very particular criteria. In fact, the mesh of most existing belt and basket screens is much larger than $3/32"$ such that small fish may be injured by being drawn into or through the mesh, or by being buffeted by turbulent high velocity waters, against the uneven front surface of the mesh screen.

SUMMARY OF THE INVENTION

The present invention overcomes many of the drawbacks presented by existing traveling water screen devices and provides a screen that meets the specifications of the California Department of Fish and Game. The traveling water and fish screen of the present invention is of a new configuration that is neither a belt screen nor basket screen. Instead, a continuous band of specially constructed rigid panels or sections is provided. Support members in the form of cross bars are provided between each panel, and the panels are pivotally attached to the cross bars. The proximity of each panel to the adjacent cross bars is extremely close. Chains or other mounting means are provided along the outside edges of the panels. The cross bars, but not the panels themselves, are attached to the chains.

An elongated support carriage is provided in which two rotating cylinders are mounted, one at either end. The continuous sectional band extends around the cylinders with the chains mounted around head- and footsprockets located on the cylinders. As the cylinders rotate, they pull the chains thereby rotating the sectional band inside the carriage. The very small pre-defined gap between the panel members and cross bars is maintained as the as the band rotates around both the upper and lower cylinders. Flaps are provided on the outward, upstream edges of the carriage to prevent debris from coming into contact with the sprockets or chains.

Each of the rigid panels is in the form of a grate or frame having a first set of parallel cross members, and a second set of parallel cross members that are perpendicular to the first set. The ends of the cross members on the outward, upstream surface of each panel are flat and smooth. This helps prevent entanglement of debris and injury to fish.

These same cross members are also tapered such that they are wider on the outward, upstream surface tapering to a more narrow cross-section toward the inside surface. As a result, the gaps between these members are smaller on the outward, upstream surface, but these same gaps are wider on the inside surface. The tapering of these cross members facilitates easier spray cleaning, since the pressurized spray is received through the wide inside ends of the tapered gaps and concentrated into and through the narrow outside openings.

Each panel is attached to the cross bars on either side of it using a set of unique pivotal hinges. Each hinges is fixedly attached to the panel member, and rotatably mounted on the adjacent cross bar. The hinges support the panel as it lies flat as it moves between the cylinders. As the panel travels around each cylinder, the hinges on each of the adjacent cross bars rotate, thereby keeping the panel at the same distance between the cross bars as it travels around the cylinder.

It is therefore a primary object of the present invention to provide a traveling water screen which employs a continuous band of rigid grate panels instead of wire mesh to separate debris from raw water in a channel of flowing water.

It is a further important object of the present invention to provide a traveling fish screen which employs a continuous band of rigid grate panels, each panel having a generally smooth outer surface and very small openings, in order to prevent injury to fish as debris is separated from raw water in a channel of flowing water.

It is a further object of the present invention to provide a traveling fish and water screen which employs a continuous band of rigid grate panels, each panel being separated by and hingedly attached to intermediate cross support members.

It is a further object of the present invention to provide a traveling fish and water screen which employs a continuous band of rigid grate panels separated by and hingedly attached in very close proximity to intermediate cross support members.

It is a further object of the present invention to provide a traveling fish and water screen which employs a continuous band of rigid grate panels, each panel having very small openings therein which prevent most fish from passing therethrough, and which panels are separated by and hingedly attached in very close proximity to intermediate cross support members.

It is a further object of the present invention to provide a traveling fish and water screen which employs carriage containing a continuous band of rigid grate panels separated by and hingedly attached in very close proximity to intermediate cross support members such that the gap between such panels and cross members remains essentially constant as the panels travel around pivots at either end of the carriage.

It is a further object of the present invention to provide a traveling fish and water screen which employs a continuous band of rigid grate panels, each panel having very small tapered openings therein which facilitate easy cleaning of accumulated debris thereon.

Additional objects of the invention will be apparent from the detailed descriptions and the claims herein.

BRIEF DESCRIPTION OF THE DRAWINGS

FIG. 4 is an enlarged top view of a portion of one of the grate panels of the present invention showing detail thereof (rotated ninety degrees from the view shown in FIG. 2).

FIG. 5 is a side view of the grate panel along line 5—5 of FIG. 4.

FIG. 6 is an end view of the grate panel along line 6—6 of FIG. 4.

DETAILED DESCRIPTION OF THE DRAWINGS

Figure 1:
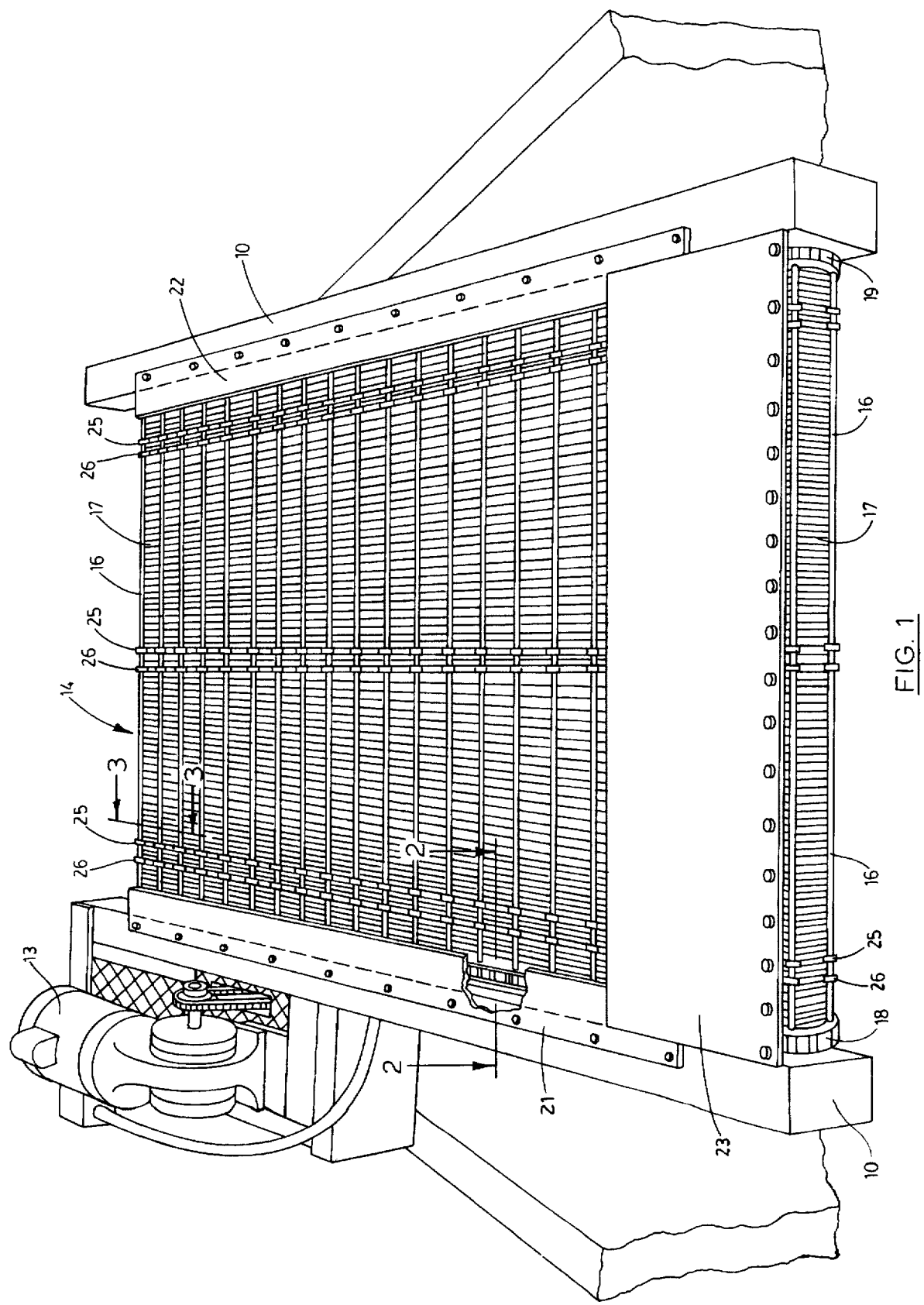
FIG. 1 is a bottom perspective partially cut-away view of the present invention showing the water and fish screen mounted inside the support carriage.
Figure 2:
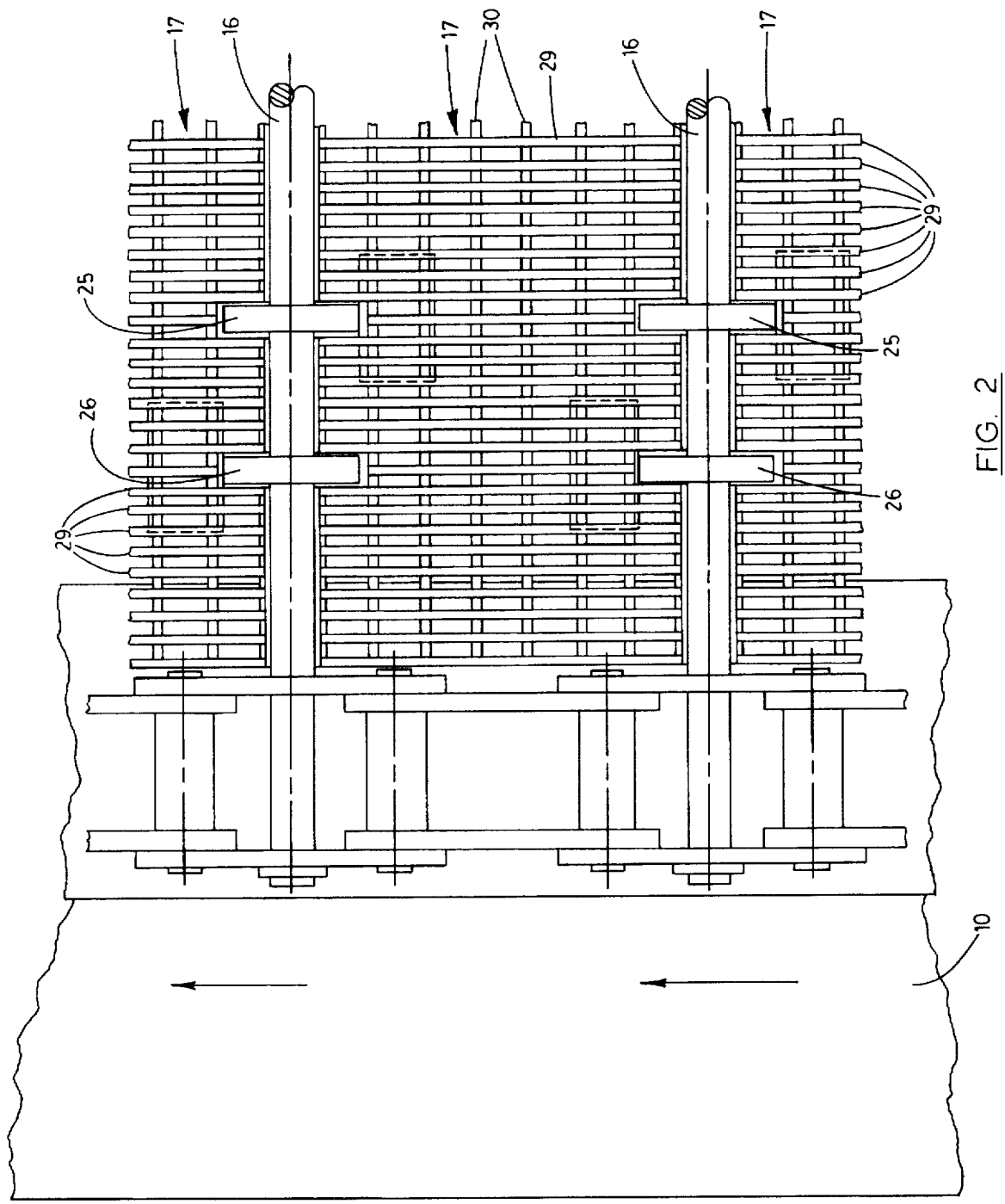
FIG. 2 is a top view of the chain and hinge assemblies of the present invention along line 2—2 of FIG. 1.
Figure 3:
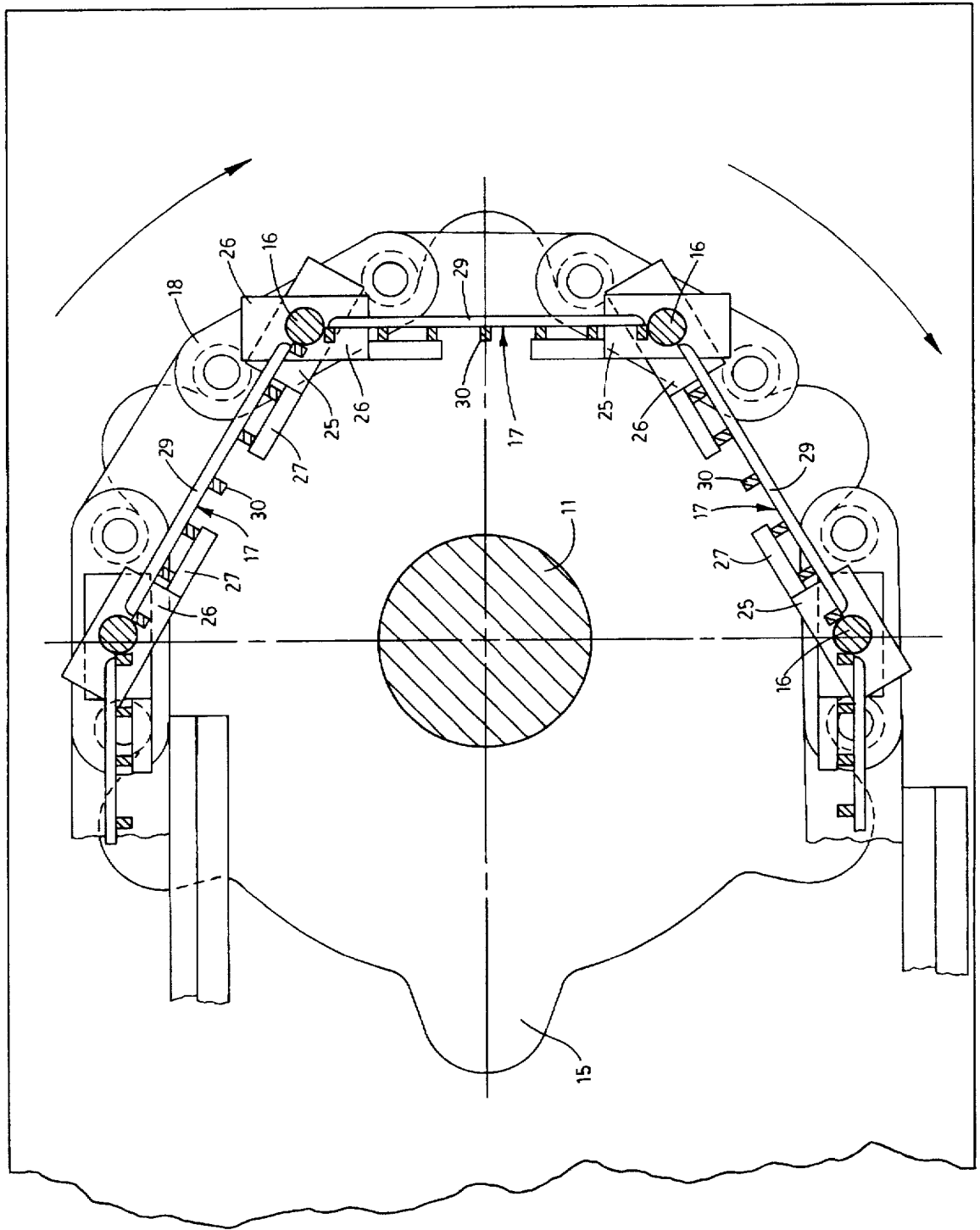
FIG. 3 is a cutaway side view of the cylinder and sprocket assembly along line 3—3 of FIG. 1 showing the screen panels traveling around.

Referring to the drawings wherein like reference characters designate like or corresponding parts throughout the several views, and referring particularly to FIGS. 1–3 it is seen that the invention includes an elongated frame or carriage 10 having rotatable upper 11 and lower 12 cylinders mounted at either end thereof. Upper cylinder 11 is rotated by the action of mechanical means 13, such as a diesel, gasoline or electric motor A plurality of rigid grate panel members 17 are provided in a continuous band 14 between chains 18 and 19 which are, in turn, mounted on sprockets 15 such that they travel around both upper and lower cylinders 11 and 12 inside carriage 10. Guard flaps 21 and 22 are provided on carriage 10 to prevent debris from raw water from becoming entangled in chains 18 and 19. A larger flap 23 is provided at the bottom of carriage 10 to prevent debris from coming into contact with submerged cylinder 12 or the panel members 17 as they travel around it.

A plurality of cross support members 16 are provided, one between each grate panel 17. The ends of cross support members 16 are attached, respectively, to chains 18 and 19.

Panel members 17 are attached to leading and trailing hinge members 25 and 26 which are pivotally attached to the adjacent cross support members 16. As shown in FIG. 1, each panel member 17 is attached by a set of leading hinge members 25 to each leading cross support member 16, and by a different set of trailing hinge members 26 to each trailing cross support member 16. Each hinge member includes a section 27 which is fixedly attached to panel member 17.

Panel members 17 include a first set of parallel cross; members 29, and a second set of parallel cross members 30 mounted perpendicular to the first set 29. Cross members 29 are spaced closer together than cross members 30 (see FIG. 4). Cross members 29 are tapered such that their outward ends 31 are larger and wider than their inward ends 32 where they are attached to members; 30 (see FIG. 6).

In use, the carriage 10 is placed into a water flow, ordinarily to cover an opening at a branch in a main flow, such that flap 23 is under water at the bottom, and motor 13 is above the flow. Engaging motor 13 imparts rotational movement to cylinder 11 and chains 18 and 19. This causes the continuous band 14 of rigid panel members 17 to rotate. The band rotation is such that the upstream, outward surface (shown in FIG. 1) moves upward, with panels 17 coming up from underneath flap 23, traveling around cylinder 11, then down the back side (see FIG. 3), and finally around cylinder 12 where they start back up again from behind flap 23.

As the chains travel around cylinders 11 and 12, they pull cross support members 16 and panels 17 around the cylinders. The gap between each panel member 17 and the support members 16 on either side is very small, and is maintained as they travel around the cylinders by the pivoting action of leading and trailing hinge members 25 and 26 on support members 16 (see FIG. 3).

Water is drawn through the screen such that debris collects on the outward, upstream surfaces of panels 17. Side flaps 21 and 22 prevent such debris from collecting on chains 18 and 19. The debris is carried with panels 17 around top cylinder 11. As the panels travel down the back side of carriage 10, a high pressure spray (not shown) sprays from the inside out, through the panels, removing the debris therefrom.

DESCRIPTION OF THE PREFERRED EMBODIMENTS

In the preferred embodiment, the rigid grate panel members 17 are made of stainless steel, or other suitable durable material. The upstream, outward surfaces 31 of the cross bars 29 on these panels should be flat and slightly wider than the inside surfaces 32 which are more pointed and narrow. This tapering facilitates less injury to fish and easier cleaning by the high pressure spray. The inside surfaces of the panel cross bars are attached to a second set of perpendicular non-tapered cross bars 30 forming a grate structure for each panel. The openings in the grate panels should be no larger than three-thirty-seconds of an inch (3/32") in order to prevent injury to fish populations while allowing a sufficient water flow through the panels.

The leading and trailing hinges 25 and 26 are pivotally and rotatably mounted on cross support members 16, and are fixedly attached to cross bars 30 of panel members 17. A separate section 27 may be used to provide broad attachment of hinges 25 and 26 to cross bars 29 (see FIG. 3). The gap between support members 16 and panel members 17 should be no larger than the grate panel openings themselves, preferably no larger than three-thirty-seconds of an inch (3/32").

The bottom flap 23 and side flaps 21 and 22 should be made of a thick, durable rubberized waterproof material in order to prevent water and debris from reaching the chains or submerged cylinder 12 of the machine, and to withstand the friction of the movement of the panels, hinges and chains in the device. Motor 13 can be electrical, gasoline, or diesel, depending upon the screen location and availability of power.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

We claim:

1. An improved traveling water screen and fish protection device comprising:
   a. an elongated carriage having an upper and lower cylinder rotatably mounted in parallel at either end thereof;
   b. means for imparting motion to one of said cylinders;
   c. two continuous flexible support chains provided in said carriage extending around both of said cylinders at each of the opposite ends thereof;
   d. a plurality rigid cross support members attached to said chains in parallel with said cylinders;
   e. a plurality of flat rigid panels mounted between said support members, each such panel having an inner and outer surface and being in the form of a grate with a first plurality of rigid parallel cross members attached to a second plurality of perpendicular, rigid cross members defining a plurality of small rectangular openings in each panel sized to prevent small fish from passing therethrough, the outer edges of said first plurality of rigid parallel cross members being flatter and wider than the inward tapered edges of the same members in order to minimize injury to fish in the near vicinity thereof;
   f. a plurality of flat hinges for pivotally attaching said panels to said cross support members, each such hinge including a front piece and a rear piece, each such front piece having a bore therethrough for pivotal attachment to an adjacent cross support member and having a flat outer surface which is flush with the outer surface of the adjacent flat grate panel, each such rear piece being attached between an inner surface of said front piece and the inner surface of the adjacent grate panel for securement of the hinge to the panel, each such panel also being in such close proximity to the adjacent cross support members that small fish are prevented front passing therebetween;
   g. a first flap means on said carriage covering said chains; and
   h. a second flap means on said carriage covering said lower cylinder.

2. The water screen device described in claim 1 wherein each of said panels maintains a constant close proximity to the adjacent cross support members as they rotate around the upper and lower cylinders of said device.

3. The device described in claim 1 wherein the constant distance between each of said panels and each of said cross support members is no more than three-thirty-seconds of an inch (3/32").

4. The device described in claim 3 wherein the panel openings are no larger than three-thirty-seconds of an inch (3/32").

5. The water screen device described in claim 1 wherein the means for imparting motion is selected from the group consisting of: an electric motor, a gasoline powered motor, and a diesel motor.

6. The water screen device described in claim 1 wherein the flap means are made of durable rubberized material.

7. The water screen device described in claim 1 wherein the two continuous flexible support means are in the form of chains.

8. The band described in claim 1 wherein the rectangular panel openings are small enough to prevent the passage of minnows therethrough.

9. A continuous band for use in a traveling water screen comprising a pair of flexible support chains having a plurality of rigid flat grate panels alternating between a plurality of rigid support members attached between said chains, each such panel having an inner and outer surface and having a first plurality of rigid parallel cross members attached to a second plurality of perpendicular rigid cross members defining a plurality of small rectangular openings in each panel sized to prevent small fish from passing therethrough, the outer edges of said first plurality of rigid parallel cross members being flatter and wider than the inward tapered edges of the same members in order to minimize injury to fish in the near vicinity thereof, said panels being pivotally attached to and in very close proximity to said adjacent support members in order to prevent fish from passing therebetween by using a plurality of flat hinges, each such hinge including a front piece and a rear piece, each such front piece having a bore therethrough for pivotal attachment to an adjacent support member and having a flat outer surface which is flush with the outer surface of the adjacent flat grate panel, each such rear piece being attached between an inner surface of said front piece and the inner surface of the adjacent grate panel for securement of the hinge to the panel.

10. The band described in claim 9 wherein said panels maintain a constant close proximity to the adjacent cross support members as they rotate around the upper and lower cylinders of a traveling water screen.

11. The band described in claim 10 wherein each of said panels is in the form of a grate having a first plurality of rigid parallel cross members attached to a second plurality of perpendicular rigid cross members defining a plurality of rectangular openings in each panel.

12. The band described in claim 11 wherein the outward upstream edges of said first plurality of rigid parallel cross members are flat and wider than the inward tapered edges of the same members.

13. The band described in claim 12 wherein the constant distance between each of said panels and each of said rigid support members is no more than three-thirty-seconds of an inch (3/32").

14. The band described in claim 12 wherein the panel openings are no larger than three-thirty-seconds of an inch (3/32").

15. The band described in claim 12 wherein the rectangular panel openings are small enough to prevent the passage of minnows therethrough.

16. A traveling water screen comprising:
   a. an elongated carriage having an upper and lower cylinder rotatably mounted in parallel at either end thereof;
   b. means for imparting motion to one of said cylinders;
   c. two continuous flexible support chains provided in said carriage extending around both of said cylinders at each of the opposite ends thereof;
   d. a plurality rigid cross support members attached to said chains in parallel with said cylinders;
   e. a plurality of flat rigid grate panels mounted between and in close proximity to the adjacent cross support members thereby forming a continuous band through which water may pass, each such panel having a first plurality of rigid parallel cross members attached to a second plurality of perpendicular rigid cross members defining a plurality of small rectangular openings in each panel for preventing the passage of minnows therethrough;
   f. a plurality of flat hinges on each grate panel, each such hinge including a front piece and a rear piece, each such front piece having a bore therethrough for pivotal attachment to an adjacent cross support member and having a flat outer surface which is flush with the outer surface of the adjacent flat grate panel, each such rear piece being attached between an inner surface of said front piece and the inner surface of the adjacent grate panel for securement of the hinge to the panel;
   g. a first flap means on said carriage covering said chains; and
   h. a second flap means on said carriage covering said lower cylinder.

17. The traveling water screen described in claim 16 wherein the outward upstream edges of said first plurality of rigid parallel cross members are flat and wider than the inward tapered edges of the same members in order to prevent injury to fish.

* * * * *